United States Patent
Roberts et al.

(10) Patent No.: US 11,994,100 B2
(45) Date of Patent: May 28, 2024

(54) MANUFACTURING OF SEGMENTED WIND TURBINE BLADE

(71) Applicants: BLADE DYNAMICS LIMITED, Eastleigh Hampshire (GB); LM WIND POWER A/S, Kolding (DK)

(72) Inventors: David Roberts, Kolding (DK); Lars Bang Jønsson, Kolding (DK); Manish Mukherjee, Eastleigh Hampshire (GB); Paul Todd, Eastleigh Hampshire (GB); Mark Hancock, Eastleigh Hampshire (GB)

(73) Assignees: BLADE DYNAMICS LIMITED, Eastleigh Hampshire (GB); LM WIND POWER A/S, Kolding (DK)

( * ) Notice: Subject to any disclaimer, the term of this patent is extended or adjusted under 35 U.S.C. 154(b) by 0 days.

(21) Appl. No.: 17/289,327

(22) PCT Filed: Oct. 25, 2019

(86) PCT No.: PCT/EP2019/079176
§ 371 (c)(1),
(2) Date: Apr. 28, 2021

(87) PCT Pub. No.: WO2020/089074
PCT Pub. Date: May 7, 2020

(65) Prior Publication Data
US 2022/0018327 A1    Jan. 20, 2022

(30) Foreign Application Priority Data
Oct. 29, 2018 (GB) .................................. 1817599

(51) Int. Cl.
*F03D 80/30* (2016.01)
*F03D 1/06* (2006.01)
*F03D 80/50* (2016.01)

(52) U.S. Cl.
CPC .......... *F03D 1/0675* (2013.01); *F03D 80/30* (2016.05); *F03D 80/50* (2016.05);
(Continued)

(58) Field of Classification Search
CPC .... F03D 1/0633; F03D 1/0641; F03D 1/0675; F03D 1/0683; F03D 13/10; F03D 80/30; F05B 2240/302
See application file for complete search history.

(56) References Cited

U.S. PATENT DOCUMENTS 9,790,919 B2 * 10/2017 Leonard ................ F03D 1/0675
2011/0091326 A1   4/2011 Hancock
(Continued)

FOREIGN PATENT DOCUMENTS

| EP | 3098439 A1 | 11/2016 |
|---|---|---|
| JP | 2012087753 A | 5/2012 |
| JP | 2017129091 A | 7/2017 |

OTHER PUBLICATIONS

Notice of Reasons for Refusal dated Jun. 20, 2023 corresponding to Japanese application No. 2021-547905.

*Primary Examiner* — Sang K Kim
(74) *Attorney, Agent, or Firm* — Nath, Goldberg & Meyer; Jerald L. Meyer; Tanya E. Harkins

(57) ABSTRACT

The present invention relates to a method of manufacturing a wind turbine blade comprising the steps of manufacturing a pressure shell halves and arranging a spar structure (62) within one of the shell halves. The spar structure (62) comprises two parts releasably coupled to each other. The method results in a segmented wind turbine blade for easy transportation and re-assembly.

15 Claims, 4 Drawing Sheets

Figure 1:
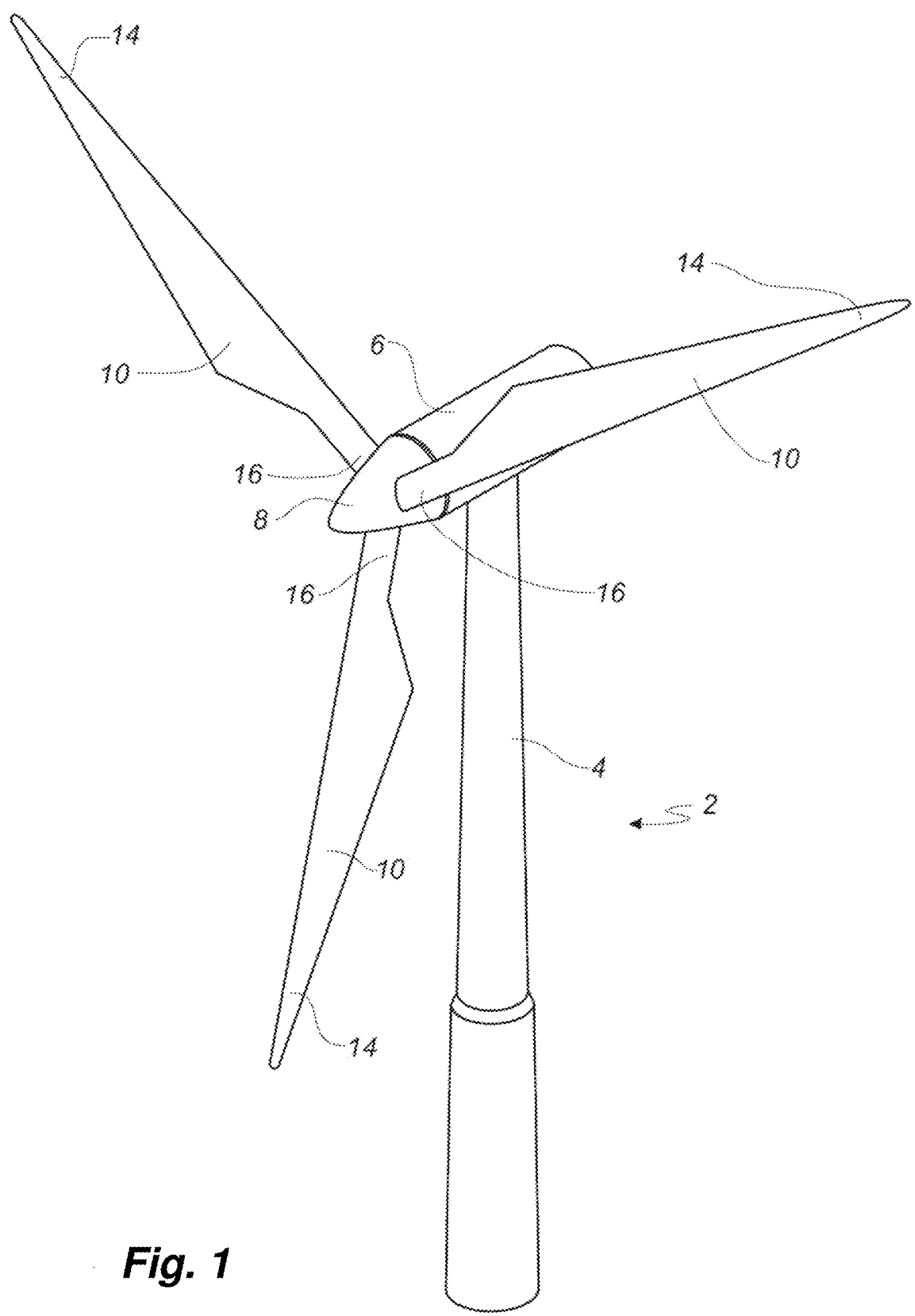

(52) U.S. Cl.
CPC ..... *F05B 2230/10* (2013.01); *F05B 2240/302* (2013.01); *F05B 2260/30* (2013.01)

(56) References Cited

U.S. PATENT DOCUMENTS

| | | | |
|---|---|---|---|
| 2011/0158788 A1* | 6/2011 | Bech | F03D 1/0683 |
| | | | 29/889.7 |
| 2014/0286780 A1* | 9/2014 | Lemos | F03D 80/50 |
| | | | 29/889.71 |
| 2014/0341738 A1 | 11/2014 | Bech et al. | |
| 2015/0132137 A1* | 5/2015 | Humblot | F01D 5/282 |
| | | | 156/92 |
| 2015/0369211 A1* | 12/2015 | Merzhaeuser | F03D 80/30 |
| | | | 416/61 |
| 2016/0348642 A1 | 12/2016 | Hayden et al. | |
| 2017/0363063 A1 | 12/2017 | Yarbrough et al. | |
| 2018/0223796 A1 | 8/2018 | Yarbrough et al. | |
| 2018/0340510 A1* | 11/2018 | Huth | F03D 1/0675 |
| 2019/0145383 A1* | 5/2019 | Christiansen | F03D 1/0675 |
| | | | 416/146 R |

* cited by examiner

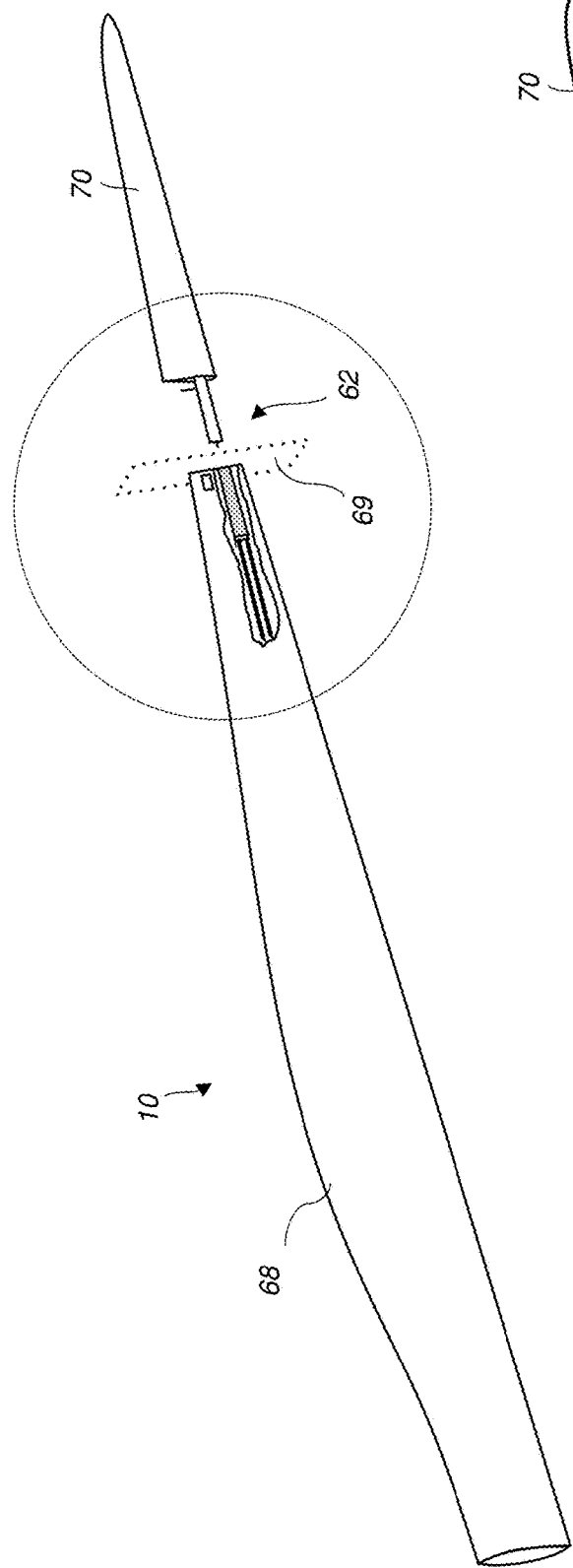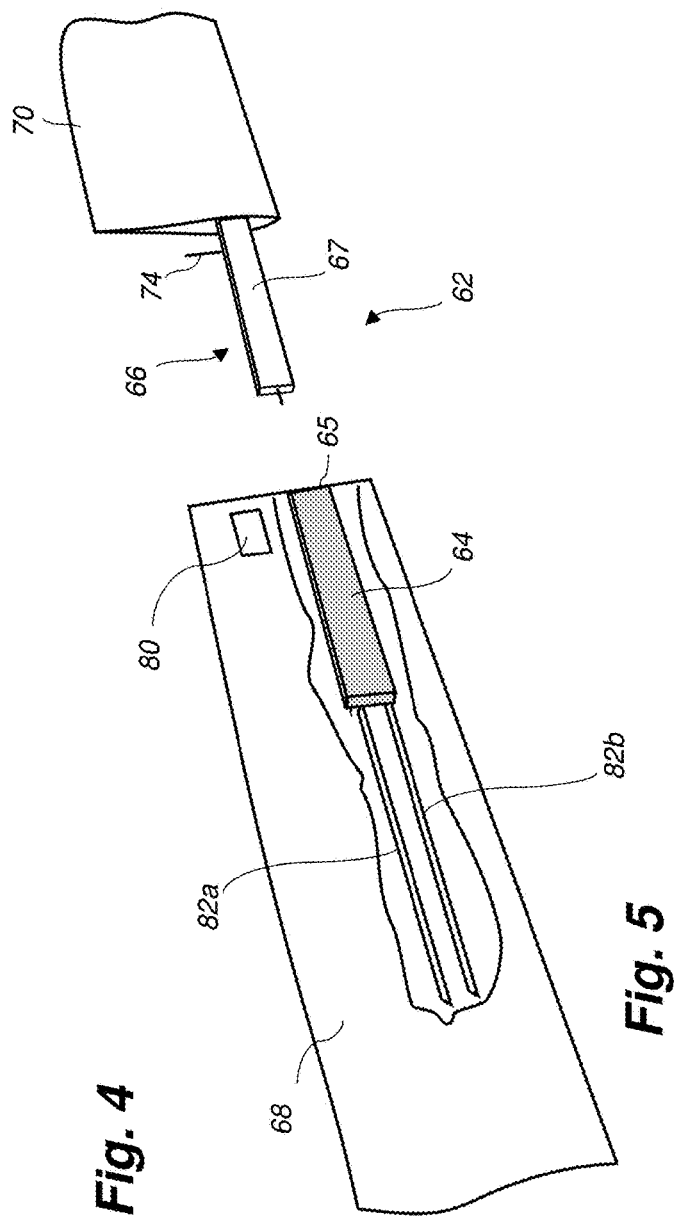
Fig. 4
Fig. 5

MANUFACTURING OF SEGMENTED WIND TURBINE BLADE

This is a National Phase Application filed under 35 U.S.C. 371 as a national stage of PCT/EP2019/079176, filed Oct. 25, 2019, an application claiming the benefit of Great Britain Application No. 1817599.2, filed Oct. 29, 2018, the content of each of which is hereby incorporated by reference in its entirety.

FIELD OF THE INVENTION

The present invention relates to a method of manufacturing a wind turbine blade, and to a wind turbine blade obtainable by said method.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbines increases, the manufacturing and transporting of wind turbine blades becomes more challenging and costly. To address this, it is known to provide a wind turbine blade in two or more segments. This may result in an easier manufacturing process and may reduce the costs of transportation and erecting of wind turbines. The blade segments may be transported to the erection site where they can be assembled to form the wind turbine blade.

However, a number of challenges may be associated with such design, relating to the manufacturing and joining of the shell segments including load bearing structures such as spar beams, shear webs or other internal components.

It is therefore an object of the present invention to provide a wind turbine blade with improved stability, easy manufacturing, handling and assembly.

It is another object of the present invention to provide an efficient method for manufacturing a segmented wind turbine blade with internal reinforcing structures.

SUMMARY OF THE INVENTION

The present invention relates to a method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising manufacturing a pressure side shell half and a suction side shell half over substantially the entire length of the wind turbine blade, closing and joining the shell halves for obtaining a closed shell, cutting the closed shell along a cutting plane substantially normal to the spanwise direction of the closed shell to obtain a first and a second blade segment, each blade segment comprising part of the pressure side shell half and part of the suction side shell half, separating the first blade segment from the second blade segment and joining and sealing the first blade segment to the second blade segment for obtaining the wind turbine blade.

This method provides an improved and efficient way of segmenting and re-assembling wind turbine blades. Preferably, the method further comprises a step of arranging a spar structure within one of the shell halves prior to closing and joining the shell halves.

It has also been found that one or more of the aforementioned objects can be obtained by a method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising the steps of:

a1) manufacturing a pressure side shell half and a suction side shell half over substantially the entire length of the wind turbine blade, b1) arranging a spar structure within one of the shell halves, the spar structure comprising a first part and a second part, the first and second part being releasably coupled to each other, c1) closing and joining the shell halves for obtaining a closed shell, d1) cutting the closed shell along a cutting plane substantially normal to the spanwise direction of the closed shell to obtain a first and a second blade segment, each blade segment comprising part of the pressure side shell half and part of the suction side shell half, wherein the spar structure extends across the cutting plane, e1) uncoupling the first and second part of the spar structure, f1) separating the first blade segment from the second blade segment, g1) joining and sealing the first blade segment to the second blade segment for obtaining the wind turbine blade.

By manufacturing the wind turbine blade using a spar structure comprising a first part and a second part, releasably coupled to each other, an efficient and elegant method is provided for segmenting and re-assembling such wind turbine blade, including uncoupling and preferably re-coupling said parts.

Preferably, the pressure side shell half and the suction side shell half are manufactured over the entire length of the wind turbine blade, i.e. over their entire final length. The pressure side shell half and the suction side shell half will typically be adhered or bonded to each other near the leading edge and near the trailing edge. Each shell half may comprise longitudinally/spanwise extending load carrying structures, such as one or more main laminates or spar caps, preferably comprising reinforcement fibres such as glass fibres, carbon fibres, aramid fibres, metallic fibres, such as steel fibres, or plant fibres, or mixtures thereof. The shell halves will typically be produced by infusing a fibre lay-up of fibre material with a resin such as epoxy, polyester or vinyl ester.

Usually, the pressure side shell half and the suction side shell half are manufactured using mould structures. In some embodiments, the shell halves remain in the mould structure during steps a1, b1, and c1. Each of the shell halves may comprise spar caps or main laminates provided along the respective pressure and suction side shell members. The spar caps or main laminates may be affixed to the inner faces of the shell halves.

The spar structure is preferably a longitudinally extending load carrying structure, preferably comprising a beam or spar box for connecting and stabilizing the shell halves. The spar structure may be adapted to carry a substantial part of the load on the blade.

In some embodiments, the spar structure is arranged within the pressure side shell half in step b1). In other embodiments, the spar structure is arranged within the suction side shell half in step b1). The spar structure comprises a first part and a second part, the first and second part being releasably coupled to each other, such as releasably fixed or locked to each other. In some embodiments, the first and second part are releasably coupled to each other by one or more mechanical devices. In some embodiments, the first and second part are releasably coupled to each other by a mechanical locking mechanism. The second part of the spar structure may advantageously comprise a spar beam or a spar box. The first part of the spar structure may preferably comprise an arrangement for receiving the second part, such as a hollow member or a sheath.

The joining step in c1) may be carried out using any suitable joining mechanism or process, including adhesives, bonding material, mechanical fasteners, and any combination of the same. The closed shell obtained in c1) is preferably a full-length preform of the final wind turbine blade obtainable by the method of the present invention.

In step d1) the closed shell is cut along a cutting plane substantially normal to the spanwise direction or longitudinal axis of the closed shell. In other words, the spanwise direction or longitudinal axis of the closed shell is substantially normal to said cutting plane. It is preferred that only the shell body is cut along the cutting plane. It is also preferred that the spar structure is not cut in step d1.

In some embodiments, the first blade segment constitutes 30-80%, such as 40-70%, of the entire longitudinal extent of the blade. In some embodiments, the second blade segment constitutes 10-50%, such as 20-40%, of the entire longitudinal extent of the blade. Advantageously, the spar structure extends across the cutting plane, preferably without being cut. The first and second blade segments may include respective ends with complimentary joint sections that are joinable at a chord-wise joint.

The step e1) of uncoupling the first and second part of the spar structure is preferably performed by unlocking a mechanical locking mechanism. In some embodiments, the uncoupling is performed through an opening formed in one or both of the shell halves, preferably an opening in the first blade segment. Such opening may be formed after the cutting operation or before the cutting operation of step d1).

After separating the first blade segment from the second blade segment in step f1), the individual blade segments may be individually transported, for example by respective trucks. The first blade segment and the second blade segment may be transported to an erection site for a wind turbine.

The step g1) of joining and sealing the first blade segment to the second blade segment for obtaining the wind turbine blade may advantageously be performed at the erection site of the wind turbine. This step may be carried out using any suitable joining and/or sealing mechanism or process, including adhesives, bonding material, mechanical fasteners, and any combination of the same.

In a preferred embodiment, the first part of the spar structure is fixed to the first blade segment. In some embodiments, the first part of the spar structure is glued or adhered to the first blade segment, preferably to both the partial suction side shell half and the partial pressure side shell half.

In a preferred embodiment, the first part of the spar structure does not extend beyond the first blade segment.

According to some embodiments, the second part of the spar structure is fixed, such as glued or adhered, to the second blade segment, preferably to both partial shell halves. The second part of the spar structure preferably extends beyond the second blade segment into the first blade segment. Thus, the second part of the spar structure preferably protrudes from within the second part of the spar structure.

In a preferred embodiment, the first blade segment comprises the root end of the blade. In another preferred embodiment, the second blade segment comprises the tip end of the blade. The blade may be also cut into more than two segments.

In some embodiments, the second part of the spar structure comprises a spar member, such as a spar beam or a spar box, the spar box preferably comprising at least one spar beam and at least one spar flange. In some embodiments, the first part of the spar structure comprises a receiving member, preferably a sheath member, for at least partly receiving or enclosing the second part of the spar structure. In some embodiments, the second part of the spar structure comprises a spar member, which is at least partly received or enclosed in a receiving structure. The receiving structure can be a jacket, for example a jacket comprising a mesh or net-like structure. In some embodiments, the jacket is made of the same material as the sheath member of the first part of the spar structure. It is preferred that the jacket is a conductive jacket.

According to some embodiments, the sheath member is substantially box-shaped. In other embodiments the sheath member is hollow. In other embodiments, the sheath member comprises a mesh or a net-structure. In a preferred embodiment, the sheath member is a conductive sheath member.

In a preferred embodiment, the conductive sheath member is part of a lightning protection system of the wind turbine blade. In a preferred embodiment the conductive sheath member of the first part and the conductive jacket of the second part are both part of a lightning protections system of a wind turbine blade.

According to some embodiments, step b1) comprises fixing the first part of the spar structure to one or both of the shell halves within the first blade segment obtained in step d1). Thus, step b1) may comprise fixing the first part of the spar structure to the partial suction side shell half and the partial pressure side shell half of the later obtained first blade segment, such as a root end blade segment.

In a preferred embodiment, step b1) comprises fixing the second part of the spar structure to one or both of the shell halves within the second blade segment obtained in step d1). Thus, step b1) may comprise fixing the second part of the spar structure to the partial suction side shell half and the partial pressure side shell half of the later obtained second blade segment, such as a tip end blade segment.

In a preferred embodiment, the spar structure comprises at least one locking pin for releasably coupling the first part to the second part of the spar structure through aligned respective locking apertures in each of the first and second part of the spar structure. In other embodiments, the spar structure comprises two or more, such as three or more, or four or more, locking pins and two or more, such as three or more, or four or more, respective locking apertures in each of the first and second part of the spar structure. Preferably, the locking apertures are respective through holes formed in the sheath member and the spar member, respectively.

According to some embodiments, step e1) comprises cutting an access opening through at least one of the shell halves for accessing the spar structure. Preferably, the access opening is cut through the shell material to allow access to the inside of the blade, in particular access to the spar structure, in particular to the one or more locking pins thereof. The access opening may be an access panel, such as a substantially rectangular access panel cut through the shell material to access the inside of the blade.

The access opening is preferably a closable opening. Typically, the access opening will be closed and/or sealed by a cover prior to finalizing the wind turbine blade.

In a preferred embodiment, step e1) comprises withdrawing the locking pin from the aligned respective apertures in each of the first and second part of the spar structure, preferably via the access opening.

In a preferred embodiment, the method further comprises a step f2) or h1) of re-coupling the first and second part of the spar structure. Thus, once the blade segments are re-joined, the first and second part can advantageously be re-coupled to fix and lock the first part to the second part.

According to some embodiments, said step f2) and h1) comprises re-inserting the locking pin into the aligned respective apertures in each of the first and second part of the spar structure, preferably via the access opening.

In a preferred embodiment, step d1) does not comprise cutting the spar structure.

According to some embodiments, the cutting plane of step d1) is located within a spanwise region of 0.5 L-0.8 L as seen from the root end, wherein L is the total length or longitudinal extent of the wind turbine blade between its root end and its tip end.

In a preferred embodiment, the cutting plane of step d1) coincides with an end surface of the first part of the spar structure.

It is preferred that the cutting plane of step d1) extends across the second part of the spar structure.

According to some embodiments, step g1) is carried out using a sealing member positioned between the first and second blade segments, wherein the sealing member is configured to allow relative movement between the first and second blade segments.

In a preferred embodiment, the pressure side shell half and the suction side shell half are manufactured in respective mould halves, preferably by vacuum assisted resin transfer moulding.

According to some embodiments, the pressure side shell half and the suction side shell half each have a longitudinal extent L of 50-90 m, preferably 60-80 m.

In a preferred embodiment, the pressure side shell half and the suction side shell half each comprise one or more layers of carbon fibres disposed within the first blade segment obtained in step d1).

According to some embodiments, the method further comprises a step b2) of arranging one or more shear webs in at least one of the shell halves, preferably within the first blade segment obtained in step d1). Each shear web may comprise a web body, a first web foot flange at a first end of the web body, and a second web foot flange at a second end of the web body. In some embodiments, the shear webs are substantially I-shaped. Alternatively, the shear webs may be substantially C-shaped.

In a preferred embodiment, step f1) comprises transporting the separated first and second blade segments to a predetermined location. Typically, the predetermined location will be the site of erecting the wind turbine. Advantageously, the first blade segment can be transported independently from the second blade segment.

According to some embodiments, step g1) comprises joining and sealing the first blade segment to the second blade segment at said predetermined location.

In another aspect, the present invention relates to a wind turbine blade obtainable by the method according to the present invention. The present wind turbine blade can be easily and efficiently assembled due to its spar structure and its coupling and de-coupling properties.

In another aspect, the present invention relates to a spar structure for a wind turbine blade, the spar structure comprising a first part and a second part, the first and second part being releasably coupled to each other, wherein the second part of the spar structure comprises a spar member, such as a spar beam or a spar box, the spar box comprising at least one spar beam and at least one spar flange, and wherein the first part of the spar structure comprises a sheath member for at least partly enclosing the second part of the spar structure. The spar structure may be advantageously used in the methods of manufacturing a wind turbine blade as described herein.

In a preferred embodiment, the sheath member is a conductive sheath member for a lightning protection system of a wind turbine blade.

According to another preferred embodiment, the spar structure comprises at least one locking pin for releasably coupling the first part to the second part of the spar structure through aligned respective locking apertures in each of the first and second part of the spar structure.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

Figure 2:
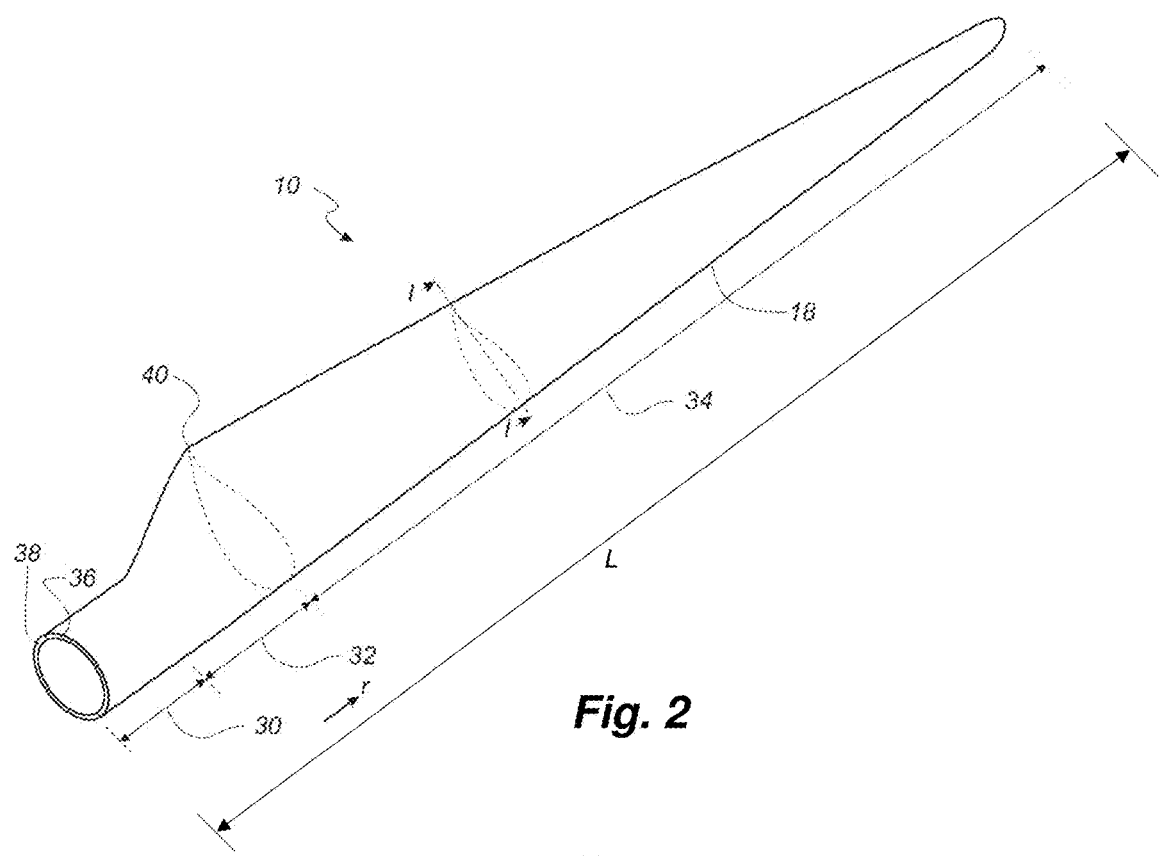
Figure 3:
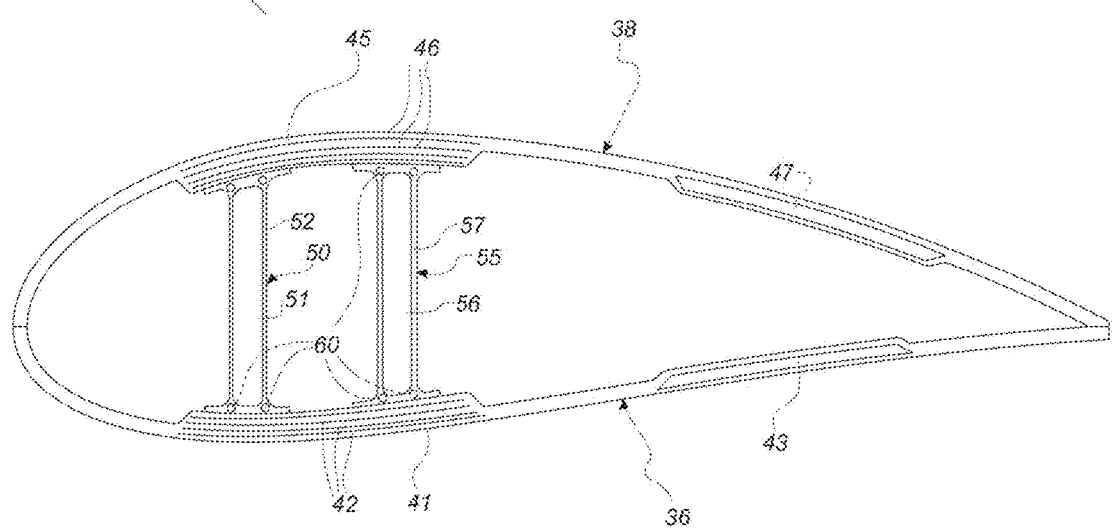

The invention is explained in detail below with reference to an embodiment shown in the drawings, in which
FIG. 1 shows a wind turbine,
FIG. 2 shows a schematic view of a wind turbine blade,
FIG. 3 shows a schematic view of a cross-section of a wind turbine blade,
FIG. 4 is a schematic cut-open view of a wind turbine blade according to the present invention,
FIG. 5 is an enlarged view of the encircled section in FIG. 4, and
FIGS. 6, 7 and 8 are perspective views of a spar structure according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

Figure 8:
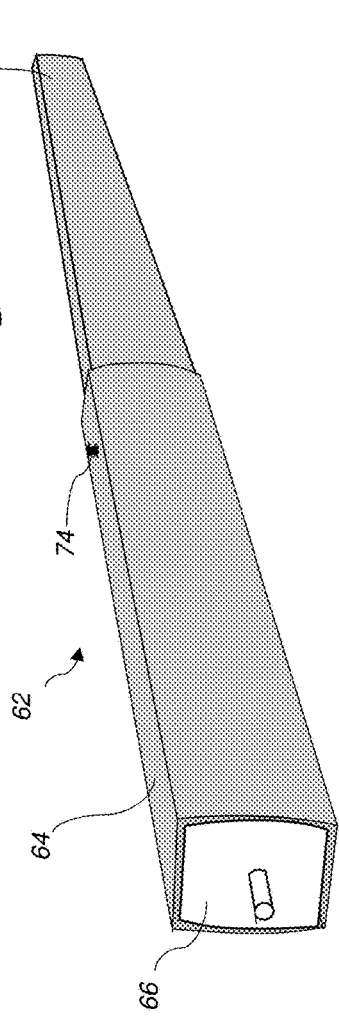

FIG. 4 is a schematic cut-open, exploded view of a wind turbine blade according to the present invention, wherein FIG. 5 is an enlarged view of the encircled section in FIG. 4. According to the method of the present invention, a pressure side shell half and a suction side shell half are manufactured over the entire length L of the wind turbine blade 10. A spar structure 62 is arranged within the shell. The spar structure 62 comprising a first part 64 and a second part 66, the first and second part being releasably coupled to each other, as shown in FIG. 8. The method advantageously comprises fixing the first part 64 of the spar structure 62 to one or both of the shell halves within the first blade segment 68 and fixing the second part 66 of the spar structure to one or both of the shell halves within the second blade segment 70.

The shell halves are then closed and joined, such as glued together for obtaining a closed shell, which is subsequently cut along a cutting plane 69 substantially normal to the spanwise direction or longitudinal extent of the blade to obtain a first blade segment 68 and a second blade segment 70. The cutting plane 69 coincides with an end surface 65 of the first part 64 of the spar structure.

As seen in FIGS. 4 and 5, the spar structure 62 extends across the cutting plane 69. As best seen in FIG. 5, the first part 64 of the spar structure 62, which takes the form of a box-shaped sheath member for at least partly enclosing the second part 66 of the spar structure in the illustrated embodiment, is fixed to the first blade segment 68. The second part 66 of the spar structure 62, which comprises a spar box in the illustrated embodiment, is fixed to the second blade segment 70, wherein the second part 66 extends beyond the second blade segment 70 into the first blade segment 68, when the blade segments are assembled.

Figure 6:
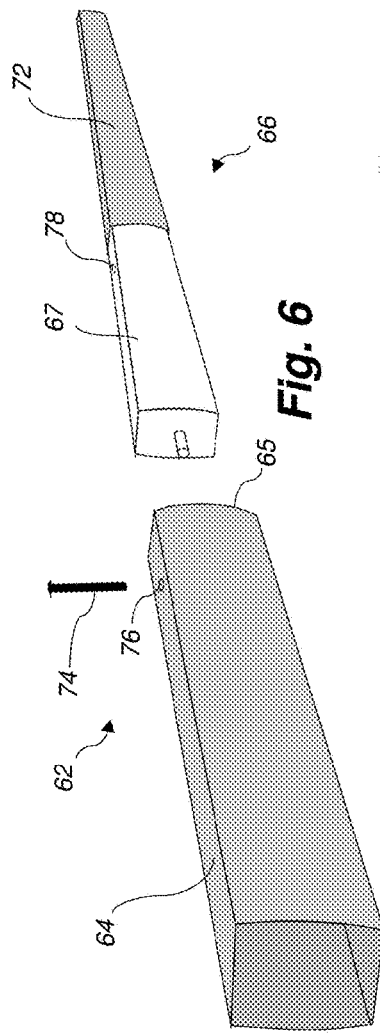
Figure 7:
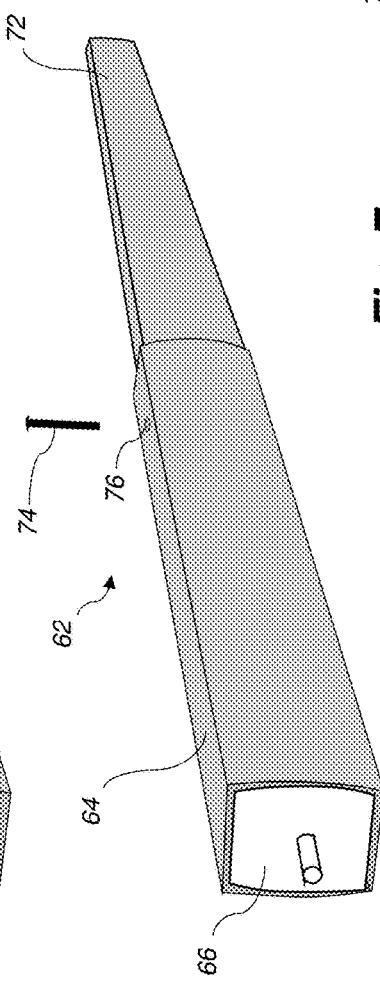

FIG. 5 also illustrates an access opening 80 cut through the upper half of the illustrated shell for accessing the spar structure and coupling and uncoupling the first and second part of the spar structure 62. For uncoupling, a locking pin, as illustrated in FIGS. 6-8, is withdrawn from the aligned respective apertures 76, 78 in each of the first and second part of the spar structure via the access opening 80. Prior to, or after, joining and sealing the first blade segment 68 to the second blade segment 70 for obtaining the wind turbine blade, the method advantageously comprises re-coupling the first and second part of the spar structure, via the access opening 80, as illustrated in FIG. 8, by re-inserting the locking pin 74 into the aligned respective apertures 76, 78 in each of the first and second part of the spar structure. As seen in FIGS. 4 and 5, the cutting step d1) does not comprise cutting the spar structure, only the shell halves are cut. In addition, two shear webs 82a, 82b are arranged within the first blade segment.

FIGS. 6-9 illustrate an embodiment of the spar structure 62 with the first part 64 in the form of a conductive, box-shaped sheath member. Preferably, the conductive sheath member is part of a lightning protection system of the wind turbine blade. The second part 66 of the spar structure comprises a box spar 67, part of which is encased in a jacket 72, for example comprising a conductive mesh 72. The spar structure 62 comprises a locking pin 74 for releasably coupling the first part 64 to the second part 66 of the spar structure through aligned respective locking apertures 76, 78 in each of the first and second part of the spar structure.

The invention is not limited to the embodiments described herein and may be modified or adapted without departing from the scope of the present invention.

LIST OF REFERENCE NUMERALS 4 tower
6 nacelle 8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 spar structure
64 first part
65 end surface of first part
66 second part
67 spar member
68 first blade segment
69 cutting plane
70 second blade segment
72 jacket/mesh
74 locking pin
76 aperture
78 aperture
80 access opening
82 shear web
L length
r distance from hub
R rotor radius

The invention claimed is:

1. A method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising:
   manufacturing a pressure side shell half and a suction side shell half over an entire length of the wind turbine blade;
   arranging a spar structure (62) within one of the pressure side and suction side shell halves, the spar structure (62) comprising a first part (64) and a second part (66), the first part (64) and the second part (66) being releasably coupled to each other when arranged within one of the pressure side and suction side shell halves, wherein the first part (64) comprises a sheath member for at least partly enclosing the second part (66), wherein the second part (66) of the spar structure (62) comprises a spar beam or a spar box, wherein the sheath member is box-shaped, and wherein the sheath member is a conductive sheath member which is part of a lightning protection system of the wind turbine blade;
   closing and joining the pressure side and suction side shell halves for obtaining a closed shell;
   cutting the closed shell along a cutting plane (69) normal to the spanwise direction of the closed shell to obtain a first blade segment (68) and a second blade segment (70), each of the first and the second blade segments comprising part of the pressure side shell half and part of the suction side shell half, wherein the spar structure (62) extends across the cutting plane (69), and wherein the second part (66) of the spar structure (62) extends beyond the second blade segment (70) into the first blade segment (68);
   uncoupling the first part (64) of the spar structure (62) from the second part (66) of the spar structure (62);
   separating the first blade segment (68) from the second blade segment (70); and
   joining and sealing the first blade segment (68) to the second blade segment (70) for obtaining the wind turbine blade.

2. The method according to claim 1, wherein the step of arranging the spar structure (62) within one of the pressure side and suction side shell halves is performed prior to the step of closing and joining the pressure side and suction side shell halves.

3. The method according to claim 1, wherein the first part (64) of the spar structure (62) is fixed to the first blade segment (68).

4. The method according to claim 1, wherein the second part (66) of the spar structure (62) is fixed to the second blade segment (70).

5. The method according to claim 1, wherein the step of arranging the spar structure (62) within one of the pressure side and suction side shell halves comprises fixing the first part (64) of the spar structure (62) to one or both of the pressure side and suction side shell halves within the first blade segment (68).

6. The method according to claim 1, wherein the step of arranging the spar structure (62) within one of the pressure side and suction side shell halves comprises fixing the second part (66) of the spar structure (62) to one or both of the pressure side and suction side shell halves within the second blade segment (70).

7. The method according to claim 1, wherein the spar structure (62) comprises at least one locking pin (74) for releasably coupling the first part (64) to the second part (66) of the spar structure (62) through aligned respective locking apertures in each of the first part (64) and the second part (66) of the spar structure (62).

8. The method according to claim 1, wherein the step of uncoupling the first part (64) of the spar structure (62) from the second part (66) of the spar structure (62) comprises cutting an access opening (80) through at least one of the pressure side and suction side shell halves for accessing the spar structure (62).

9. The method according to claim 8, wherein the step of uncoupling the first part (64) of the spar structure (62) from the second part (66) of the spar structure (62) comprises withdrawing the at least one locking pin (74) from the aligned respective apertures in each of the first part (64) and the second part (66) of the spar structure (62).

10. The method according to claim 1, wherein the method further comprises the step of re-coupling the first part (64) and the second part (66) of the spar structure (62).

11. The method according to claim 1, wherein the cutting plane (69) coincides with an end surface of the first part (64) of the spar structure (62).

12. The method according to claim 1, wherein the step of separating the first blade segment (68) from the second blade segment (70) comprises transporting the separated first and second blade segments to a predetermined location.

13. The method according to claim 1, wherein the spar box comprises at least one spar flange.

14. The method according to claim 9, wherein the at least one locking pin (74) is withdrawn from the aligned respective apertures in each of the first part (64) and the second part (66) of the spar structure (62) via the access opening (80).

15. A wind turbine blade obtainable by the method according to claim 1.

\* \* \* \* \*